United States Patent Office 3,067,240
Patented Dec. 4, 1962

3,067,240
NEW DICARBAMATE AND PROCESS OF PREPARING SAME
Elias Edy Rosenberg, Paris, France, assignor to Laboratoires Cassenne, Paris, France, a French body corporate
No Drawing. Filed Feb. 13, 1961, Ser. No. 88,617
Claims priority, application France Feb. 18, 1960
3 Claims. (Cl. 260—482)

The present invention has for its object to provide, as new compounds, dicarbamate derivatives of 1,1-dimethylol cyclopentane having the following general formula:

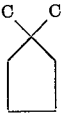

wherein R is hydrogen, an alkyl radical, or an aryl radical.

These new compounds possess an action on the central nervous system which manifests itself by a sedative effect without abolition of the natural defense reflexes.

They are also antispasmodics of the striated muscle fibre.

Therefore, they differ from the standard transquilizing drugs and, with respect to the latter, they have a minor hypnotic effect.

The toxicity of these derivatives is very low.

Among these new compounds, the following can be listed principally:

1,1-dimethylol cyclopentane dicarbamate (R=H)
1,1-dimethylol cyclopentane N,N'-diisopropyl dicarbamate (R=(CH$_3$)$_2$CH—)
1,1-dimethylol cyclopentane N,N'-diethyl dicarbamate (R=C$_2$H$_5$—)
1,1-dimethylol cyclopentane N,N'-dipropyl dicarbamate (R=CH$_3$—CH$_2$—CH$_2$—)
1,1-dimethylol cyclopentane N,N'-diphenyl dicarbamate (R=C$_6$H$_5$)
1,1-dimethylol cyclopentane N,N'-di-(p-bromophenyl)-dicarbamate (R=p-Br—C$_6$H$_4$—), and
1,1-dimethylol cyclopentane N,N'-di-(α-naphthyl)-dicarbamate (R=α-C$_{10}$H$_7$).

The invention has also for its object to provide a process for the preparation of these new compounds, wherein 1,1-dimethylol cyclopentane is reacted with phosgene and an RNH$_2$ compound or else with the reaction product of these two reagents, namely an isocyanate R—N=C=O, wherein R has the above signification.

When using phosgene and an RNH$_2$ compound, the reaction is preferably carried out in two stages; in a first stage, the 1,1-dimethylol cyclopentane is reacted with phosgene at low temperature so as to be converted to dichlorocarbonate, which is treated in the second stage with the RNH$_2$ compound to give the dicarbamate.

The reaction with phosgene is carried out conveniently in toluene solution, in the presence of a tertiary base such as antipyrine, which is capable of neutralizing the resultant hydrochloric acid.

When using an isocyanate R—N=C=O the reaction is carried out by merely heating the diol and the isocyanate.

The 1,1-dimethylol cyclopentane used as raw material can itself be prepared from cyclohexanol by the following reactions:

Dehydration of cyclohexanol to cyclohexene,
Oxidation and rearrangement of cyclohexene to cyclopentane carboxaldehyde,
Reaction of this aldehyde with formaldehyde, with resultant formation of 1,1-dimethylol cyclopentane.

The following examples illustrate the invention.

*Example 1.—1,1-Dimethylol Cyclopentane Dicarbamate*

30 g. of a 20% solution of phosgene in toluene, diluted with 30 ml. of dry toluene, are placed in a 250 ml. flask equipped with an agitator, a thermometer and a dropping funnel, and cooled to −10° C. by means of an ice+salt mixture. A solution containing 3.9 g. (0.03 mole) of dimethylol cyclopentane+11.3 g. (0.06 mole) of antipyrine in 30 ml. of dry CHCl$_3$ is added to the resultant solution over one hour, under constant stirring, and the temperature being kept below −3° C. Turbidity appears in the resultant solution, and the reaction is allowed to go on for two more hours, with stirring and without cooling (the temperature must revert slowly to 20° C.); the resultant mixture is then allowed to stand at room temperature (the flask being securely stoppered) for 1 to 3 days. After this time, the original lower liquid layer has almost entirely crystallized (antipyrine hydrochloride crystals). The crystals are filtered, and washed with a small amount of toluene (10 ml.).

A stream of dry NH$_3$ (dried over KOH) is passed through the filtrate, while cooling with a water bath, until the amount of resultant white precipitate increases no longer. The latter is sucked almost dry and dried in a vacuum to eliminate the toluene, and then washed by shaking with 30 ml. of cold water (to eliminate most of the NH$_4$Cl); it is then recrystallized from 45 ml. of boiling water. After drying in a vacuum over P$_2$O$_5$ the crystals weigh 4.15 g. (yield of pure product 64%).

Short, colourless needles. Melting point=164° C.

This dicarbamate is tested for freedom from NH$_4$Cl (no chlorine ion).

*Example 2.—1,1-Dimethylol Cyclopentane N,N'-Diisopropyl Dicarbamate*

The first stage is carried out as above. Excess isopropylamine is added to the filtrate obtained after separation of the antipyrine hydrochloride, and the solvents are evaporated off. The resultant crystalline deposit is washed with petroleum ether, then with cold water. These crystals are dissolved in ethyl alcohol, treated with charcoal, and recrystallized from alcohol. The 1,1-dimethylol cyclopentane N,N'-diisopropyl dicarbamate appears in the form of a white powder of needle-shaped crystals (M.P.= 82–84° C.), they are odourless and tasteless.

The product is soluble in alcohol and acetone, and insoluble in water, even boiling water.

*Example 3.—1,1-Dimethylol Cyclopentane N,N'-Diphenyl-Dicarbamate*

This compound is obtained by heating a mixture of 1,1-dimethylol cyclopentane and phenyl isocyanate at a temperature of 85–90° C. for one half hour. The resultant product is washed with petroleum ether, recrystallized from methanol, dissolved in acetone (impurities are filtered off) and recrystallized from acetone.

The compound appears in the form of a white powder or of needle-shaped crystals (M.P.=147–149° C.), which are tasteless and odourless.

It is insoluble in water, moderately soluble in alcohol and ether, highly soluble in acetone.

*Example 4.—1,1-Dimethylol Cyclopentane N,N'-Diethyl-Dicarbamate*

A 10% solution of 60 g. of phosgene in toluene is placed in a flask and cooled to −10° C.; the following materials are then added over one hour; 3.9 g. of 1,1-dimethylol cyclopentane+11.3 g. of antipyrine dissolved in 30 ml. of dry chloroform.

Following this addition, stirring is carried out for two hours, without cooling and the securely stoppered flask is allowed to stand for two days at room temperature.

The antipyrine hydrochloride crystals are then filtered and washed with 10 ml. of dry toluene; the filtrate and the washings are cooled to 0° C., and 10 g. of ethylamine are added; the filtrate is then evaporated, the temperature being maintained below 50° C. There remains a residue which sets to a mass. This is the crude product which is washed with petroleum ether and with water, and dried in vacuo.

The yield is about 2.8 g. of 1,1-dimethylol cyclopentane N,N'-diethyl dicarbamate.

This compound melts at 90–92° C., and has a nitrogen content of 10.29%. It appears in the form of a white powder having a slight specific odour and a bitter taste; it is insoluble in water and petroleum ether, soluble in methanol and chloroform.

*Example 5.—1,1-Dimethylol Cyclopentane N,N'-Dipropyl-Dicarbamate*

The process of Example 4 is used, but 10 g. of anhydrous monopropylamine are used instead of ethylamine. Thus are obtained about 3 g. of product melting at 54° C. and having a nitrogen content of 9.3%. The product appears in the form of a white powder having a slight specific odour and a bitter taste; it is soluble in organic solvents, and insoluble in water.

*Example 6.—1,1-Dimethylol Cyclopentane N,N'-Di-(p-Bromophenyl)-Dicarbamate*

2.6 g. of 1,1-dimethylol cyclopentane are placed in a flask and dissolved with 50 ml. of ethyl ether; 10 g. of p-bromophenyl isocyanate are then added, and stirring is carried out for 10 minutes; the ether is then distilled off and the mixture is heated at a temperature of 70° C. for 30 minutes. A solid mass appears in the flask; this mass is ground, washed with 150 ml. of petroleum ether (boiling range 70–100° C.) and the resultant product is dried under vacuo.

Thus are obtained about 10 g. of a product melting at 170–175° C. and having a nitrogen content of 5.32%. This product appears in the form of a white odourless and tasteless powder which is poorly soluble in organic solvents and insoluble in water.

*Example 7.—1,1-Dimethylol-Cyclopentane N,N'-Di(α-Naphthyl)-Dicarbamate*

3 g. of 1,1-dimethylol cyclopentane, 10 g. of α-naphthyl isocyanate and 5 ml. of white spirit (boiling range 145–200° C.) are mixed in a flask. The flask is immersed for 30 minutes in a bath at 80° C. A glassy mass appears in the flask; this is ground, washed with petroleum ether, and dried in vacuo. Thus are obtained 8.5 g. of a product melting at 190° C. and having a nitrogen content of 5.98%. The product appears in the form of a white powder having a slight specific odour; it is insoluble in water and petroleum ether, and very poorly soluble in ethanol.

As mentioned above, the new compounds according to the invention are tranquilizing drugs having no hypnotic effect, and whose freedom from toxicity is demonstrated by the following tests on rats.

100 mg. of 1,1-dimethylol cyclopentane dicarbamate are administered daily to 20 rats for 15 days.

The average weight of the rats is 300 g. (daily dose 300 mg./kg.).

A blood count and picture is carried out before and after treatment. No modification appears. Coagulation and bleeding times show no change.

10 rats are autopsied upon interruption of the treatment, and 10 rats are autopsied 15 days after the treatment. Examination of the viscera shows no pathological modification.

Similar results are obtained with the compounds described in Examples 2 to 7 inclusive.

Thus, at doses of 200 mg./kg. on intra peritoneal administration, and of 1350 mg./kg. on oral administration, both 1,1-dimethylol cyclopentane N,N'-diisopropyl-dicarbamate and 1,1-dimethylol cyclopentane N,N'-di-phenyl-dicarbamate are proved entirely free from toxicity in mice.

In addition, a pharmacological investigation of both these compounds gave the following results:

I. 1,1-DIMETHYLOL CYCLOPENTANE N,N'-DIISOPROPYL-DICARBAMATE (1) *Decontractive Effect*

The tests carried out on isolated organs, such as the ileum of rabbit and guinea-pig, show a very marked effect which is spasmolytic in character. The product exercises a very efficient action on the contracture caused by barium chloride. This is an inherent property of the product which is unusual for the compounds having a related formula, such as Procalmadiol.

(2) *Antalgic Effect*

This compound does away with the pain inherent to reflex contractures and therefore reveals itself as being an excellent antalgic drug.

(3) *Tranquilizing Effect*

This material may be considered as a tranqulizing drug in as far as by this term is meant a reduction of the spontaneous activity, unaccompanied by associated hypnotic phenomena.

II. 1,1-DIMETHYLOL CYCLOPENTANE N,N'-DIPHENYL-DICARBAMATE (1) *Study Relating to the Spontaneous Motility of Animals*

4 mg. of the product in the form of a suspension are administered intra-peritoneally to mice weighing 20 g.

For 1 to 2 hours, according to the animals, the animals remain very quiet, almost motionless, without sleepiness.

They show decreased reactions to the various stimulants, and, in particular, pricking produces little withdrawal or escape reaction.

The straightening up effort during hanging up by the tail is of markedly lesser importance than with normal subjects.

Auditory excitation by an extremely high pitched stimulus does not produce the usual starting up reactions.

Little change appears in the licking motions, and, practically one hour after the injection, the behaviour of the test animals has reverted substantially to normal.

The application to mice of actographical methods show a suspension of searching activity in the cage and a persistence of the cleansing motions which ordinarily alternate with the former motions.

Between cleansing motions, the test animals are seen to rest, although some spontaneous movements appear now and then; but these subside rapidly.

(2) *Study Relating to the Tranquilizing Effect*

The action of the product was compared to that of Procalmadiol.

The actographical tests show that the ingestion of 50 mg./kg. of 1,1-dimethylol cyclopentane N,N'-diphenyl-dicarbamate produces effects which are substantially similar to those of Procalmadiol (75 mg./kg.).

Experience has shown that the effects of 1,1-dimethylol cyclopentane N,N'-diphenyl dicarbamate were perfectly reproducible, and they could, in this respect, be compared to those obtained with other related tranquilizing drugs.

(3) *Tests Relating to Blood Pressure and Respiration*

The determination of blood pressure by means of the arm band (palpatory method) and the observation of respiration have shown no alteration in dog.

(4) *Action on the Autonomous Nervous System*

(a) Ileum of rabbit and guinea-pig

Tests carried out on the isolated organ show a very marked effect which is spasmolytic in character.

A notable effect appears with the adjunction of as little as 10 mg. of product used in the form of a solution in propylene glycol (a solvent which exercises no action on the isolated ileum).

The product has a very efficient effect on the contracture produced by barium chloride (2 to 10 mg.).

(b) Uterin cornu of guinea-pig

The spasmolytic effect on the uterine cornu of guinea-pig is extremely clear, the concentration curve assumes very rapidly a descending aspect.

The uterus treated with the product reacts no longer to post-hypophysis or to barium chloride. The action is therefore very powerful, and may be used for physiological applications.

The compounds according to the invention may be administered either alone, or in association with any other therapeutically used substance and with the usual vehicles. Oral, rectal, or parenteral administration may be carried out, as the case may be.

Posology will vary according to the degree of the disease, the type of administration selected from 0.10 to 2 g. divided over 24 hours.

When the oral administration is selected, the compounds are advantageously administered in the form of tablets containing 0.25 g. of active principle.

It is under this form that they were utilized in the following clinical cases which are given for the purpose of illustrating the therapeutic applications of the products according to the invention.

I. 1,1-DIMETHYLOL-CYCLOPENTANE N,N'-DI-ISOPROPYL DICARBAMATE

Mrs. G. Martine, age 50, wireless technician. Has been complaining for months of lumbar pains. Claims that she is unable to lift the wireless boxes, which interfere with her work. She is very nervous and sleeps very badly.

On examination, the entire lumbar area is very painful. Backward and forward motions, together with lateral flexions are performed with difficulty.

*Treatment:* One 0.25 g. tablet of the product in the morning and at noon. Two tablets at night, for 20 days. Excellent tolerance.

*Results:* As early as the second day of treatment, the pains disappear entirely. The patient sleeps very well.

*Conclusions:* The decontractive and analgesic effect of the drug are clearly evidenced in this case.

II. 1,1-DIMETHYLOL CYCLOPENTANE N,N'-DIETHYL DICARBAMATE

Mr. P. . . . Jacques, age 49, travelling salesman. Fell off a ladder six years ago. Limped for three weeks after this fall. The right ankle was very swollen, and showed ecchymotic injuries.

Since this accident, Mr. P. . . . complains of intermittent pains in the right heel, especially during weather changes. He complains also of dorso-lumbar pains, with contractures, which prevent him from bending. He is very nervous and irritable.

On examination, a slight dorsal scoliosis is seen, with left concavity, and a discrete limitation of the movements of right lateral flexion.

*Treatment:* 4 tablets daily.
*Tolerance:* Excellent.
*Results:* The pain is considerably reduced. The patient is much more quiet.

III. 1,1-DIMETHYLOL CYCLOPENTANE N,N'-DIPROPYL DICARBAMATE

Mrs. M . . . V . . ., age 28, housewife. Nephrectomy in 1946 because of renal tuberculosis. Has been complaining for years of severe headaches and of lumbosacral pains.

The patient has been treated with aspirin, butazolidine and amidopyrin. Tolerance to these drugs is very bad. Mrs. V. . . is bedridden, and is bent double due to an excruciating pain irradiating in the right leg. She is very nervous and cannot sleep.

On examination, all the projection sites of the right sciatic nerve are found to be very painful: positive Lassègue sign.

X-ray examination of the spine shows (seen in front) a considerable flattening of the disk at L4–L5 with considerable dorso-lumbar cyphosis, and osteophytes on the side view.

*Treatment:* 4 tablets daily.
*Tolerance:* Excellent.
*Results:* The pain decreases very rapidly, one hour after administration of the first tablet. Two days after the onset of the treatment, the patient suffers no longer. The patient is very quiet, no longer complains of pains, and sleeps well.

*Conclusions:* Decontractive effect. Very good result.

IV. 1,1,-DIMETHYLOL CYCLOPENTANE N,N'-DI-(p-BROMOPHENYL)-DICARBAMATE

Mr. M. . . Guido, age 32, translator. Automobile accident. Fractures of the right 8th, 9th, 10th and 11th ribs. Multiple, non severe, trauma, with haematoma on the right thigh and shoulder. The patient is examined 8 days after the accident. During this time, he underwent treatment with infiltration of novocaine, tight bandage, and 3 tablets daily of Palfium.

The patient complains of an excruciating pain in the right side, with dyspnoea. He is very restless and does not sleep. His facies is hollow, and he breathes with difficulty. Examination of the thorax shows a decreased expansion on the right side.

On auscultation of the lungs: The respiration is found to be sibilant at the base, and to be abolished at the extreme base. Percussion is very painful and shows some dullness. Radioscopic examination shows a slight effusion which completely fills the sinus.

*Treatment:* One million units of penicillin+1 gramme of streptomycin daily for eight days. Then, three injections weekly, for three weeks. Two tablets of 1,1-dimethylol cyclopentane N,N'-di(p-bromophenyl)-dicarbamate, morning, noon and night during the first three days. Then, 4 tablets daily for eight days.

*Tolerance:* Very good.
*Results:* As early as the first day of treatment, the patient suffers markedly less, he is quiet and sleeps well. His pains disappear very rapidly. After 21 days of treatment, the pleural reaction has entirely disappeared.

*Conclusion:* Decontractive effect. Tranquilizing effect. Very good results.

V. 1,1-DIMETHYLOL CYCLOPENTANE N,N'-DI(α-NAPHTHYL)-DICARBAMATE

Mrs. L. . . Dora, age 52, housewife. Temperamentally disturbed, instability, nervousness, irritability, for a number of years. Mrs. L. complains of extreme nervousness by trifling difficulties, of fits of anguish accompanied by multiple somatic manifestations, such as gulps, functional dyspnoea, gastro-oesophageal contraction, palpitation, thoracal compression.

The neurological examination reveals no sign of an injury of the central nervous system. Pulse 108. Blood pressure 15/9. Menopause occurred two years ago.

*Treatment:* 2 tablets morning and night for three weeks.
*Tolerance:* Perfect.
*Results:* The patient is able to sleep better, she is markedly less irritable, and her fits of anguish are more seldom and less intense.

*Conclusion:* Tranquilizing effect. Good result.

Having now described my invention what I claim as new and desire to secure by Letters Patent is:

1. A compound selected from the group consisting of 1,1-dimethylol cyclopentane N,N'-diphenyl dicarbamate and 1,1-dimethylol cyclopentane N,N'-di(α-naphthyl)-dicarbamate.

2. 1,1-dimethylol cyclopentane N,N'-diphenyl dicarbamate.

3. 1,1-dimethylol cyclopentane N,N'-di-(α-naphthyl) dicarbamate.

References Cited in the file of this patent

UNITED STATES PATENTS

| | | |
|---|---|---|
| 2,822,379 | Grimme | Feb. 4, 1958 |
| 2,934,559 | Beinfest | Apr. 26, 1960 |
| 2,967,880 | Finke | Jan. 10, 1961 |

OTHER REFERENCES

Ludwig et al., J. Am. Chem. Soc. 73, 5779–5780 (1951).